US012494690B2

(12) United States Patent
Kim

(10) Patent No.: US 12,494,690 B2
(45) Date of Patent: Dec. 9, 2025

(54) HYBRID DRIVING MODULE

(71) Applicant: VALEO KAPEC CO., LTD., Daegu (KR)

(72) Inventor: Jung-Woo Kim, Daegu (KR)

(73) Assignee: VALEO KAPEC CO., LTD., Daegu (KR)

( * ) Notice: Subject to any disclaimer, the term of this patent is extended or adjusted under 35 U.S.C. 154(b) by 223 days.

(21) Appl. No.: 18/259,531

(22) PCT Filed: Dec. 30, 2021

(86) PCT No.: PCT/KR2021/020244
§ 371 (c)(1),
(2) Date: Jun. 27, 2023

(87) PCT Pub. No.: WO2022/146066
PCT Pub. Date: Jul. 7, 2022

(65) Prior Publication Data
US 2024/0063683 A1 Feb. 22, 2024

(30) Foreign Application Priority Data

Dec. 31, 2020 (KR) .................. 10-2020-0189898
Dec. 28, 2021 (KR) .................. 10-2021-0189907

(51) Int. Cl.
*H02K 5/173* (2006.01)
*B60K 6/26* (2007.10)
(Continued)

(52) U.S. Cl.
CPC .............. *H02K 5/173* (2013.01); *B60K 6/26* (2013.01); *B60K 6/405* (2013.01); *F16C 19/06* (2013.01);
(Continued)

(58) Field of Classification Search
CPC .......... H02K 5/173; H02K 7/08; H02K 7/108; B60K 6/26; B60K 6/405;
(Continued)

(56) References Cited

U.S. PATENT DOCUMENTS 865,836 A     9/1907   Wedekind
10,161,457 B2   12/2018   Gluck
(Continued)

FOREIGN PATENT DOCUMENTS

EP   3 736 952 A1   11/2020
JP   2007-333125 A   12/2007
(Continued)

OTHER PUBLICATIONS

Korean Office Action issued on Sep. 27, 2023 in Korean Patent Application No. 10-2021-0189907 (with unedited computer-generated English translation), 11 pages.
(Continued)

*Primary Examiner* — Ahmed Elnakib
(74) *Attorney, Agent, or Firm* — Oblon, McClelland, Maier & Neustadt, L.L.P.

(57) ABSTRACT

A hybrid driving module includes a housing and an axial movement prevention part configured to restrict forward and rearward movements of a rotor hub relative to the housing. The axial movement prevention part provided in a bearing interposed between the housing and the rotor hub. The bearing includes a first race configured to adjoin a first peripheral surface, a second race configured to adjoin a second peripheral surface, and rolling elements interposed between the first race and the second race. The axial movement prevention part includes a bearing groove provided in a surface of the first race, a circumferential surface groove provided in a first circumferential surface, and a clearance prevention ring inserted across the circumferential surface
(Continued)

groove and the bearing groove. A height of the clearance prevention ring is equal to or smaller than a depth of the circumferential surface groove.

15 Claims, 9 Drawing Sheets

(51) Int. Cl.
   *B60K 6/405* (2007.10)
   *F16C 19/06* (2006.01)
   *H02K 7/08* (2006.01)

(52) U.S. Cl.
   CPC ............ *H02K 7/08* (2013.01); *B60Y 2200/92* (2013.01); *B60Y 2400/60* (2013.01); *F16C 2380/26* (2013.01)

(58) Field of Classification Search
   CPC .. B60K 2006/4825; B60K 6/387; B60K 6/48; F16C 19/06; F16C 2380/26; F16C 19/54; F16C 2226/52; F16C 35/063; F16C 2226/74; F16C 2361/43; F16C 35/067; B60Y 2200/92; B60Y 2400/60; F16D 2300/12; F16D 25/10; F16D 25/0638
   USPC .......................................................... 310/90
   See application file for complete search history.

(56) References Cited

U.S. PATENT DOCUMENTS

| | | |
|---|---|---|
| 2002/0072421 A1 | 6/2002 | Ouchi |
| 2003/0060294 A1 | 3/2003 | Ouchi |
| 2017/0045088 A1 | 2/2017 | Gluck |
| 2017/0136867 A1* | 5/2017 | Holmes .................... B60K 6/48 |
| 2018/0283469 A1* | 10/2018 | Lorenz .................... F16D 21/06 |
| 2019/0273410 A1* | 9/2019 | Satyaseelan ......... H02K 5/1732 |
| 2021/0379982 A1* | 12/2021 | Omote .................... B60K 6/48 |
| 2023/0038832 A1* | 2/2023 | Kim ....................... B60K 6/405 |
| 2024/0063683 A1* | 2/2024 | Kim ....................... B60K 6/387 |

FOREIGN PATENT DOCUMENTS

| | | |
|---|---|---|
| JP | 2018-21569 A | 2/2018 |
| JP | 2019-11818 A | 1/2019 |
| KR | 10-1428081 B1 | 8/2014 |
| KR | 10-2018-0040682 A | 4/2018 |
| KR | 10-2021-0099285 A | 8/2021 |
| WO | WO 2020/263057 A1 | 12/2020 |

OTHER PUBLICATIONS

Extended European Search Report issued Apr. 12, 2024, in corresponding European Patent Application No. 21915863.1, 6 pages.
International Search Report issued Apr. 11, 2022 in PCT/KR2021/020244 filed on Dec. 30, 2021, 3 pages.

* cited by examiner

HYBRID DRIVING MODULE

TECHNICAL FIELD

The present invention relates to a hybrid driving module, and more particularly, to a hybrid driving module, in which a sealing structure is provided between a housing, which is a fixed end of the hybrid driving module, and a rotor hub configured to rotate relative to the housing, and a motor position sensor is mounted between a motor and an output member.

BACKGROUND ART

A driving module used for a hybrid vehicle has a structure configured to transmit a force of a motor and a force of an engine to a transmission. A hybrid driving module includes an input member configured to receive the force of the engine, a motor, an engine clutch configured to connect the input member and the motor, an output member configured to receive the force of the motor and/or the engine and transmit the force to the transmission, and a power transmission part configured to connect the motor and the output member. The power transmission part may be structured to directly connect the motor and the output member or structured to include a torque converter (fluid clutch) and a lock-up clutch.

The motor may include a stator and a rotor, and the rotor may be installed on a rotor hub. A space in which the clutch and the like are installed is provided in a radial internal space of the rotor defined by the rotor hub. After the clutch and the like are installed in the space, a cover or a hub ridge is installed to cover the space. The hub ridge is installed to rotate integrally with the rotor hub.

The stator is installed in a housing. Further, the input member, the rotor hub, the output member, and the like are installed to be rotatable relative to the housing.

The clutch installed in a radial internal space of the rotor hub is operated or released by hydraulic pressure. Further, the hydraulic pressure may be supplied to the radial internal space of the rotor hub through the housing. In this case, the hydraulic pressure, which is provided to operate the clutch, is also applied as a force that moves the rotor hub from the housing in an axial direction. The axial movement of the rotor hub relative to the housing causes interference between components, which may cause a risk of abrasion. Further, the interference and abrasion may cause a severe abnormal operation of the hybrid driving module. Therefore, a structure is additionally required to prevent a relative axial movement between the housing and the rotor hub.

Meanwhile, in case that a component, such as a thrust bearing, is added as an axial support structure for preventing the relative movement between the housing and the rotor hub, the number of components and the number of assembling processes are increased, which may cause an increase in production costs. Accordingly, there is a need for a structure capable of preventing the relative movement between the housing and the rotor hub while minimizing the number of components and the number of assembling processes.

DISCLOSURE

Technical Problem

The present invention has been made in an effort to solve the above-mentioned problem, and an object of the present invention is to provide a hybrid driving module that prevents a rotor hub from moving in an axial direction relative to a housing.

Another object of the present invention is to provide a hybrid driving module that prevents a relative movement between a housing and a rotor hub while minimizing the number of components and the number of assembling processes.

Technical Solution

To achieve the above-mentioned objects, the present invention may be applied to a hybrid driving module having a motor 40 including a rotor 42 and a stator 41.

The hybrid driving module may include: a housing 80 in which the stator 41 is installed; a rotor hub 43 on which the rotor 42 is installed, the rotor hub 43 being configured to be rotatably supported by the housing 80; and an axial movement prevention part configured to restrict forward and rearward movements of the rotor hub 43 relative to the housing 80 between the housing 80 and the rotor hub 43.

The axial movement prevention part may be provided in a bearing B2 or B3 interposed between the housing 80 and the rotor hub 43 and configured to support a rotation of the rotor hub 43 relative to the housing 80.

The bearing may be interposed between a peripheral surface at a side of the housing 80 and a peripheral surface at a side of the rotor hub 43 that face each other in a radial direction.

The bearing may include: a first race configured to adjoin a first peripheral surface that is one surface selected from the peripheral surface at the side of the housing 80 and the peripheral surface at the side of the rotor hub 43; a second race configured to adjoin a second peripheral surface that is the other surface selected from the peripheral surface at the side of the housing 80 and the peripheral surface at the side of the rotor hub 43; and a rolling element interposed between the first race and the second race.

Any one of the first and second races may be an inner race, and the other of the first and second races may be an outer race.

Various rolling elements, such as rollers or balls, may be used as the rolling element.

The axial movement prevention part may include: a bearing groove provided in a surface of the first race facing the first peripheral surface; a peripheral surface groove provided in the first peripheral surface and disposed at a position corresponding to the bearing groove; and a clearance prevention ring RR inserted across the peripheral surface groove and the bearing groove.

A height h of the clearance prevention ring may be equal to or smaller than a depth of the peripheral surface groove.

Selectively, the height of the clearance prevention ring may be larger than a depth of the bearing groove.

A second bearing stepped portion may be provided on the second peripheral surface and protrude in the radial direction so as to interfere with the other side of the second race based on an axial direction.

A bearing fixing part may be provided on the second peripheral surface and interfere with one side of the second race based on the axial direction.

The bearing may be fixed to the second peripheral surface first by means of the second bearing stepped portion and the bearing fixing part, and then the axial movement prevention part may be assembled.

A first bearing stepped portion may be provided on the first peripheral surface and protrude in the radial direction so as to interfere with one side of the first race based on an axial direction.

As an example, the bearing fixing part may include: a ring groove formed at a position on the second peripheral surface that does not face the second race; and a snap ring inserted into the ring groove. In this case, a snap ring portion protruding in the radial direction from the ring groove may interfere with one side of the second race based on the axial direction.

As another example, the bearing fixing part may include a plastic processing part.

The plastic processing part may be a part plastically deformed so that the second peripheral surface protrudes in the radial direction in a state in which the bearing is inserted into the second bearing stepped portion in the axial direction.

The plastic processing part may be formed by caulking processing.

In the embodiment, the housing 80 may include an input member 10 rotatably supported on the housing 80 and configured to receive driving power from an engine, and a peripheral surface at the side of the housing 80 may be provided on the input member 10.

The rotor hub 43 has a central axis extension portion 450 extending in the axial direction from the central portion of the rotor hub 43, and the peripheral surface at the side of the rotor hub 43 may be provided on the central axis extension portion 450.

A peripheral surface of the central axis extension portion 450 may be provided at a side positioned radially inward of the peripheral surface of the input member 10.

In another embodiment, the housing 80 may include an axial protruding portion 823 protruding in the axial direction from the housing 80, and the peripheral surface at the side of the housing 80 may be provided on the axial protruding portion 823.

The rotor hub 43 may include a hub ridge 46 connected to the rotor hub 43 so that a rotation thereof is restricted. The hub ridge 46 may extend in the radial direction. An axial extension portion 464 is provided at a radial inner side of the hub ridge 46 and extends in the axial direction from the hub ridge 46. The peripheral surface at the side of the rotor hub 43 may be provided on the axial extension portion 464.

A peripheral surface of the axial protruding portion 823 may be provided at a side positioned radially inward of the peripheral surface of the axial extension portion 464.

Advantageous Effects

According to the hybrid driving module of the present invention, it is possible to improve operational stability of the hybrid driving module by restricting the axial clearance of the rotor hub with respect to the housing.

According to the present invention, because the thrust bearing function of the rolling bearing, particularly the ball bearing is used, without change, to restrict the axial clearance of the rotor hub with respect to the housing, it is not necessary to add a separate thrust bearing element.

According to the present invention, because a separate thrust bearing element is not added, it is possible to prevent the relative movement between the housing and the rotor hub while minimizing the number of components and the number of assembling processes.

The specific effects of the present invention, together with the above-mentioned effects, will be described along with the description of specific items for carrying out the present invention.

EXPLANATION OF REFERENCE NUMERALS AND SYMBOLS

Figure 1:
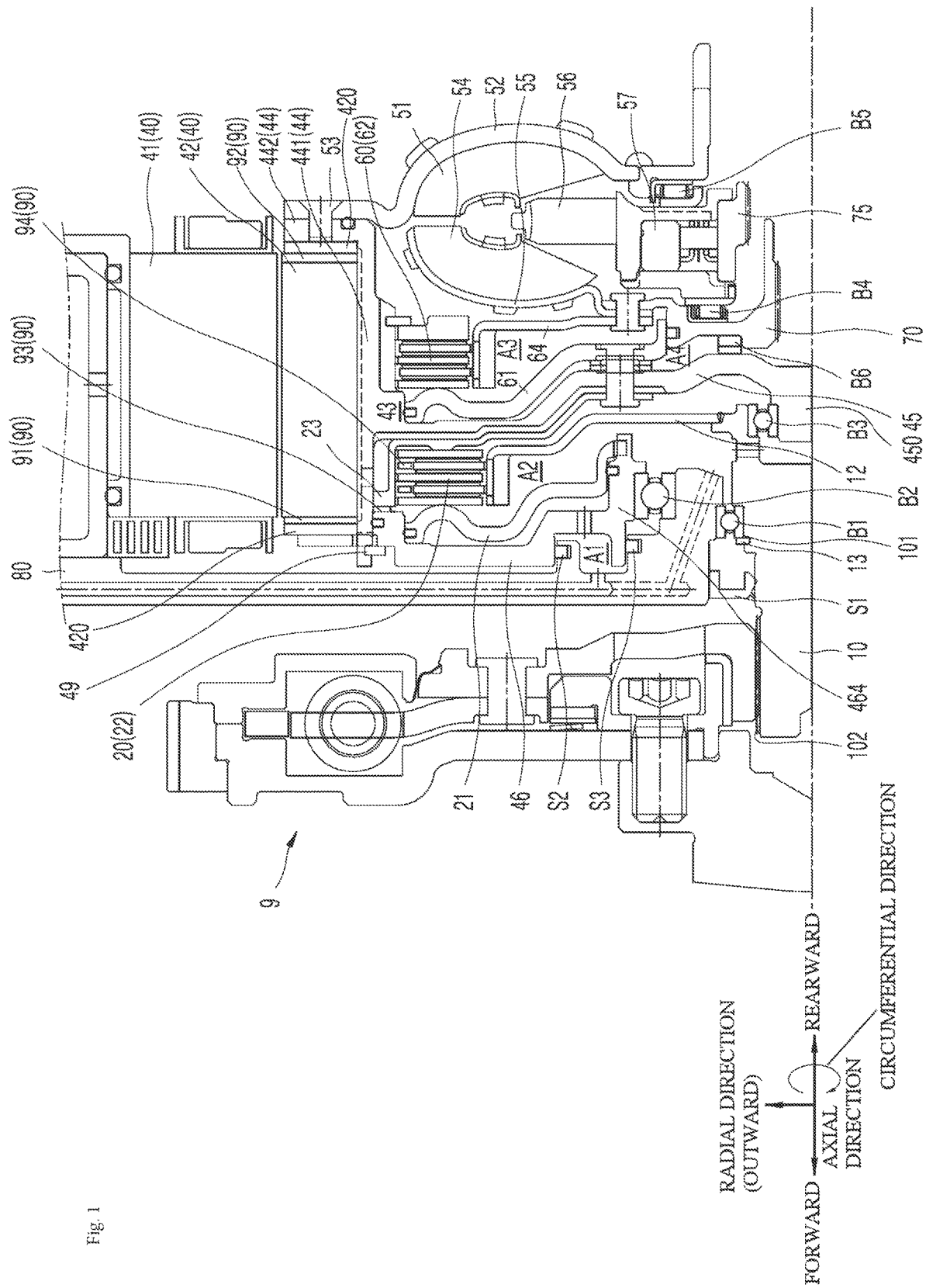
FIG. 1 is a conceptual view of a first embodiment of a hybrid driving module.

9: Spring damper
10: Input member
101: First input member ring groove
102: Spline
105: First input member stepped portion
107: Second input member stepped portion
108: Second input member ring groove
109: Second input member snap ring
110: Third input member ring groove
12: Input plate
13: First input member snap ring
20: Engine clutch
21: First piston plate
22: First clutch pack
23: First carrier
40: Motor
41: Stator
42: Rotor
420: Retainer
43: Rotor hub
44: Rotor holder
441: Radial support portion
442: Axial support portion
45: Hub plate
450: Central axis extension portion
451: Hub inner shaft
453: Central axis stepped portion
454: First central axis ring groove
455: Central axis snap ring
458: Plastic processing part (caulking part)
459: Second central axis ring groove
46: Hub ridge
464: Axial extension portion
465: Radial outer-inner peripheral surface
466: Radial inner-outer peripheral surface
467: Flow hole
468: Slide protrusion
469: Ridge stepped portion 470: Ridge snap ring
471: Ridge ring groove
4691: First sealing surface
4692: Second sealing surface
49: Hub snap ring (ridge fixing member)
50: Fluid clutch
51: Impeller
52: Back cover
53: Bolt
54: Turbine
55: Turbine plate
56: Reactor
57: One-way clutch
60: Lock-up clutch
61: Second piston plate
62: Second clutch pack
64: Output plate
70: Output member
75: Fixed end
80: Housing
821: First axial protruding portion
822: First sealing groove
823: Second axial protruding portion
824: Second sealing groove
828: Housing stepped portion
829: Housing ring groove
83: First flow path
84: Second flow path
90: Elastic body
91: First elastic body
92: Second elastic body
93: Third elastic body
94: Fourth elastic body
S1: First sealing member
S2: Second sealing member
S3: Third sealing member
B1, B2, B3, B4, B5, B6: Bearing
B21: Second inner race
B22: Second outer race
B23: Second rolling element
B24: Second bearing groove
B31: Third inner race
B32: Third outer race
B33: Third rolling element
B34: Third bearing groove
A1, A2, A3, A4: Space
RR: Clearance prevention ring

MODE FOR INVENTION

Hereinafter, exemplary embodiments of the present invention will be described in detail with reference to the accompanying drawings.

The present invention is not limited to the embodiments disclosed herein, but will be variously changed and implemented in various different forms. The embodiments are provided so that the present invention will be thorough and complete, and also to provide a more complete understanding of the scope of the present invention to those of ordinary skill in the art. Therefore, it should be understood that the present invention is not limited to the embodiments disclosed below, but the configuration of any one embodiment and the configuration of another embodiment can be substituted or added, and the present invention includes all alterations, equivalents, and alternatives that are included in the technical spirit and scope of the present invention.

It should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention. In the drawings, sizes or thicknesses of constituent elements may be exaggerated, increased, or decreased for convenience of understanding, but the protection scope of the present invention should not be restrictively construed.

The terms used in the present specification are used only for the purpose of describing particular examples or embodiments and are not intended to limit the present invention. Further, singular expressions include plural expressions unless clearly described as different meanings in the context. In the present application, the terms "comprises," "comprising," "includes," "including," "containing," "has," "having", and other variations thereof are inclusive and therefore specify the presence of features, integers, steps, operations, elements, components, and/or combinations thereof disclosed in the specification. That is, in the present application, the terms "comprises," "comprising," "includes," "including," "containing," "has," "having", and other variations thereof do not preclude the presence or addition of one or more other features, integers, steps, operations, elements, components, and/or combinations thereof.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

When one constituent element is described as being "disposed above" or "disposed below" another constituent element, it should be understood that one constituent element can be disposed directly on another constituent element, and an intervening constituent element can also be present between the constituent elements.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present application.

Because a hybrid driving module according to an embodiment is symmetrical with respect to an axis, only the half of the hybrid driving module based on the axis is illustrated for the convenience of illustration. In addition, for the convenience of description, a direction along a longitudinal direction of an axis defining a center of a rotation of the hybrid driving module is defined as an axial direction. That is, a forward/rearward direction or an axial direction is defined as a direction parallel to a rotation axis. A front (forward) means any one direction of a power source, e.g., a direction toward an engine. A rear (rearward) means the other direction, e.g., a direction toward a transmission. Therefore, a front surface means a surface facing forward, and a rear surface means a surface facing rearward.

A radial direction means a direction toward or away from a center of the rotation axis along a straight line passing through the center of the rotation axis on the plane perpendicular to the rotation axis. A direction radially away from the center is referred to as a centrifugal direction, and a direction toward the center is referred to as a centripetal direction.

A peripheral direction or a circumferential direction means a direction surrounding a periphery of the rotation axis. An outer periphery means an outer circumference, and an inner periphery means an inner circumference. Therefore, an outer peripheral surface is a surface facing away from the rotation axis, and an inner peripheral surface is a surface facing the rotation axis.

A circumferential surface means a surface, a normal line of which is directed in a circumferential direction.

[Hybrid Driving Module]

Hereinafter, a structure of a hybrid driving module according to embodiments will be described with reference to FIGS. 1 to 4.

The hybrid driving module according to the embodiment includes an input member 10 connected to an output side of an engine and configured to receive an output of the engine, and an output member 70 configured to transmit driving power of a motor or driving power of the motor and the engine to a transmission.

The output of the engine is inputted to the input member 10 via a spring damper 9. The spring damper 9 is a torsional damper. The spring damper 9 engages with a spline 102 of the input member 10, and a mutual rotation thereof is restricted. The spring damper 9 mitigates fluctuation of the output of the engine to suppress the occurrence of vibration.

The spline 102 is provided on an outer peripheral surface of an axial front side of the input member 10. Further, an input plate 12 extending radially outward is connected to an outer peripheral surface of an axial rear side of the input member 10. The input plate 12 is integrally fixed to the input member 10 by welding or the like and rotates integrally with the input member 10.

An engine clutch 20 is connected to a radial outer end of the input member 10. The engine clutch 20 is provided between a rotor hub 43 and the input member 10 and transmits or does not transmit the output of the engine to the rotor hub 43.

The hybrid driving module includes a motor 40. The motor 40 includes an annular stator 41, and an annular rotor 42 disposed at a radial inner side of the stator 41. The rotor 42 is rotated by an electromagnetic interaction with the stator 41.

The stator 41 is fixed to a housing 80. The housing 80 is disposed forward of the motor 40 in the axial direction and extends in the radial direction. The input member 10 is rotatably supported at a radial inner end of the housing 80 by a first bearing B1. The first bearing B1 is fixed in the axial direction by a first input member snap ring 13 fitted into a first input member ring groove 101 provided in an outer peripheral surface of the input member 10. An axial rear side of an inner race of the first bearing B1 is supported by a first input member stepped portion 105 of the input member 10, and an axial front side of the inner race of the first bearing B1 is supported by the first input member snap ring 13. An outer race of the first bearing B1 is supported in the axial direction and the radial direction by the housing 80. Therefore, the input member 10 is supported in the radial direction and the axial direction with respect to the housing 80 by the first bearing B1. That is, an axial movement of the input member 10 relative to the housing 80 is restricted by the first bearing B1, the first input member stepped portion 105, and the first input member snap ring 13.

A first sealing member S1 is provided between the input member 10 and the housing 80 and seals the housing 80 to prevent the fluid in the housing 80 from leaking to the outside.

The rotor 42 is fixed to the rotor hub 43. The rotor hub 43 includes a rotor holder 44 configured to fix the rotor 42, and a hub plate 45 extending radially inward from the rotor holder 44.

The rotor holder 44 includes a radial support portion 441 configured to support an inner peripheral surface of the rotor 42, and an axial support portion 442 configured to support an axial rear end of the rotor 42. The radial support portion 441 may have a cylindrical shape extending in the axial direction. The axial support portion 442 may have a flange shape extending radially outward from the axial rear end of the radial support portion 441.

The radial support portion 441 supports an inner peripheral surface of the rotor 42, and the axial support portion 442 supports an axial rear end of the rotor 42. The axial support portion extending in the radial direction is not formed at a front end of the radial support portion 441. Therefore, the rotor 42 is externally inserted from the front side to the rear side in the axial direction, such that an inner peripheral surface of the rotor 42 is supported to face an outer peripheral surface of the radial support portion 441, and an axial rear end of the rotor 42 is supported to face a front surface of the axial support portion 442.

A hub ridge 46 is coupled to a front end of the radial support portion 441. The hub ridge 46 engages with the front end of the radial support portion 441 by means of teeth, such that the mutual rotations thereof are restricted. The hub ridge 46 further extends radially outward than the radial support portion 441. Therefore, a radial outer end of the hub ridge 46 supports a front end of the rotor 42 in the axial direction. After the hub ridge 46 is fitted with the radial support portion 441, a hub snap ring 49, which is a ridge fixing member, is fitted with a groove provided in an inner peripheral surface of the radial support portion 441 from a side positioned forward of the hub ridge 46 so that the hub ridge 46 does not separate axially forward.

The hub plate 45 is connected to the rotor holder 44 in the vicinity of an axial central portion of the radial support portion 441. The hub plate 45 extends radially inward from an inner peripheral surface of the radial support portion 441 and has a shape similar to a disk. A central axis extension part 450 extending forward is provided on a central portion of a radius of the hub plate 45, and the central axis extension part 450 is supported to be relatively rotatable by means of the input member 10 and a third bearing B3. To this end, a central axis stepped portion 453 is provided on the central axis extension portion 450 and restricts a rear position of the third bearing B3 with respect to the input member 10. A second input member stepped portion 107 is provided on the input member 10 and restrict a front position of the third bearing B3. The third bearing B3 supports the input member 10 in the axial direction and the radial direction with respect to the central axis extension part 450 of the hub plate 45.

The engine clutch 20 is installed in a space disposed radially inside the radial support portion 441 and corresponding to the axial front side of the hub plate 45. The engine clutch 20 includes a first carrier 23 and a first clutch pack 22 having a friction plate or friction member. The first carrier 23 may be installed on the hub plate 45 of the rotor hub 43. The first carrier 23 is connected to the rotor hub 43 so that a rotation of the first carrier 23 is restricted. The first carrier 23 rotates integrally with the rotor hub 43. A radial outer side of the first clutch pack 22 is connected to the first carrier 23, and a radial inner side of the first clutch pack 22 is connected to the input member 10 by the input plate 12. Clutch plates connected to the first carrier 23 and clutch plates connected to the input member 10 are alternately disposed, and friction members are interposed between the clutch plates.

A first piston plate 21 is disposed at the axial front side of the first clutch pack 22. When the first piston plate 21 presses the first clutch pack 22 in the axial direction, the input plate 12 and the first carrier 23 are connected so that the mutual rotations thereof are restricted. Therefore, the output of the engine transmitted to the input plate 12 may be transmitted to the rotor hub 43 via the engine clutch 20. When the first piston plate 21 does not press the first clutch pack 22, the mutual rotations of the input plate 12 and the first carrier 23 are not restricted. Therefore, the output of the engine is transmitted only to the input plate 12 without being transmitted to the rotor hub 43.

Figure 2:
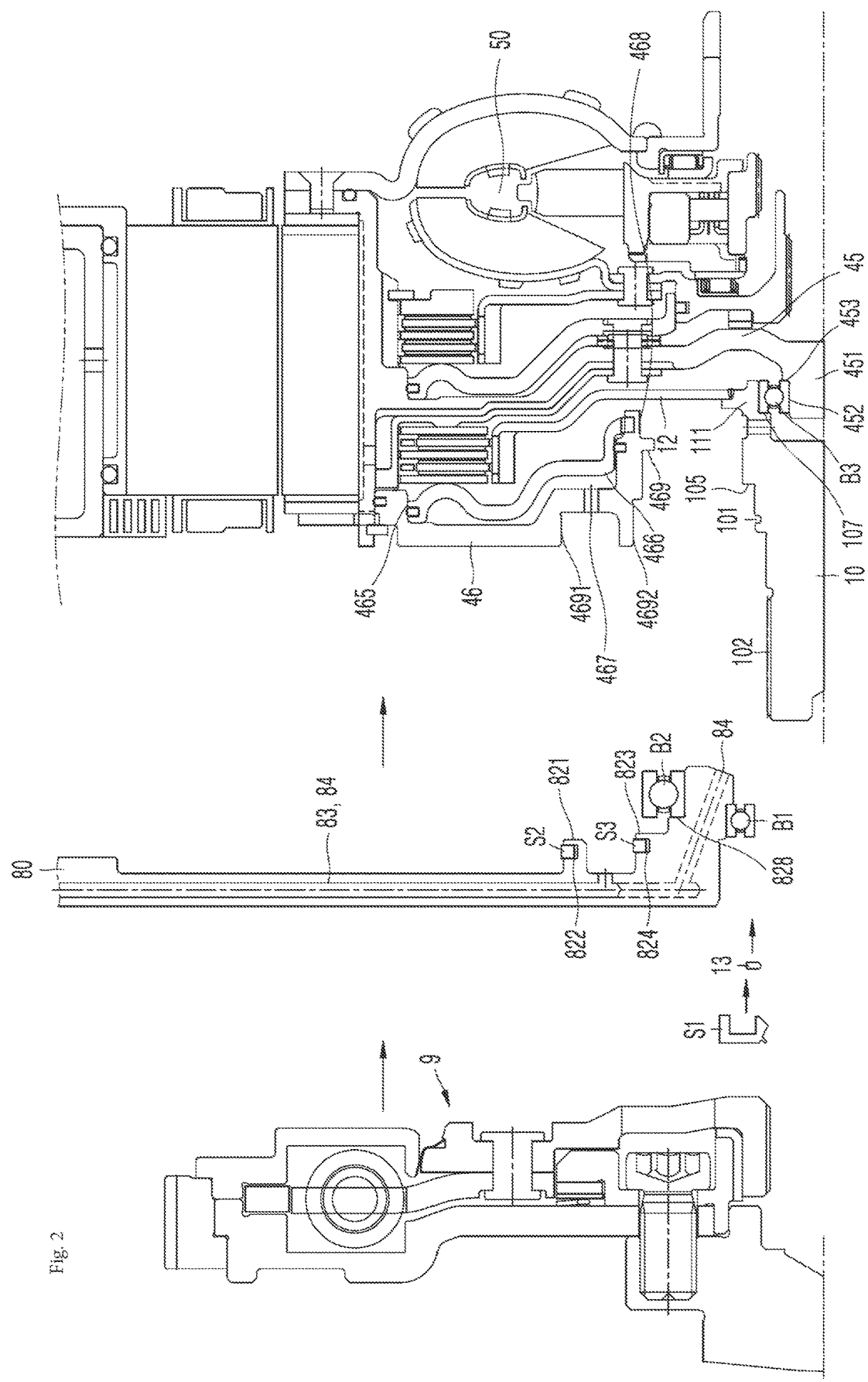
FIG. 2 is a cross-sectional side view illustrating a process of installing a housing and a spring damper on a rotor hub.

The hub ridge is disposed at an axial front side of the first piston plate 21. With reference to FIG. 2, the hub ridge 46 may be an approximately disk or circular disk-shaped member opened at a center side thereof and extending in the radial direction.

The first piston plate 21 of the engine clutch 20 is installed at an axial rear side of the hub ridge 46. The hub ridge 46 has a radial outer-inner peripheral surface 465 extending rearward from the radial outer side in the axial direction, and a radial inner-outer peripheral surface 466 extending rearward from the radial inner side in the axial direction. The radial inner-outer peripheral surface 466 is provided on an axial extension portion 464 extending rearward from a centripetal end of the hub ridge 46. The first piston plate 21 extends in the radial direction. An outer peripheral surface of a radial outer end of the first piston plate 21 adjoins the radial outer-inner peripheral surface 465 so as to be slidable in the axial direction. An inner peripheral surface of a radial inner end of the first piston plate 21 adjoins the radial inner-outer peripheral surface 466 so as to be slidable in the axial direction.

A slide protrusion 468, which further extends axially rearward, is provided at an end of the axial extension portion 464 at a radial inner side of the hub ridge 46. The slide protrusion 468 may be provided in the vicinity of the radial inner-outer peripheral surface 466. The first piston plate 21 has a slide groove having a shape complementary to the slide protrusion 468. Therefore, the first piston plate 21 may slide in the axial direction in the state in which the rotation thereof is restricted by the hub ridge 46.

A flow hole 467 is provided in the hub ridge 46 so that the fluid may be introduced into an engine clutch operation chamber that is a space defined by the first piston plate 21, a rear surface of the hub ridge 46, the radial outer-inner peripheral surface 465, and the radial inner-outer peripheral surface 466.

A first sealing surface 4691 and a second sealing surface 4692 are respectively provided on the hub ridge 46 radially outward or inward of the flow hole 467 and face a first axial protruding portion 821 and a second axial protruding portion 823 of the housing 80 in the radial direction.

Further, a first sealing groove 822 is provided in a portion of the outer peripheral surface where the first axial protruding portion 821 of the housing 80 faces the first sealing surface 4691. A second sealing member S2 is fitted with the first sealing groove 822. In addition, a second sealing groove 824 is provided in a portion of the outer peripheral surface where the second axial protruding portion 823 of the housing 80 faces the second sealing surface 4692. A third sealing member S3 is fitted with the second sealing groove 824.

A predetermined space A1, which is sealed, is provided between the housing 80 and the hub ridge 46 when the first sealing surface 4691 and the second sealing surface 4692 respectively adjoin the first axial protruding portion 821 and the second axial protruding portion 823 with the second sealing member S2 and the third sealing member S3 interposed therebetween.

A first flow path 83 is formed in the housing 80 to supply oil to the space A1. The first flow path 83 communicates with the space A1 and extends in the radial direction from the radial outer end of the housing 80 to a predetermined position between the first axial protruding portion 821 and the second axial protruding portion 823.

Figure 3:
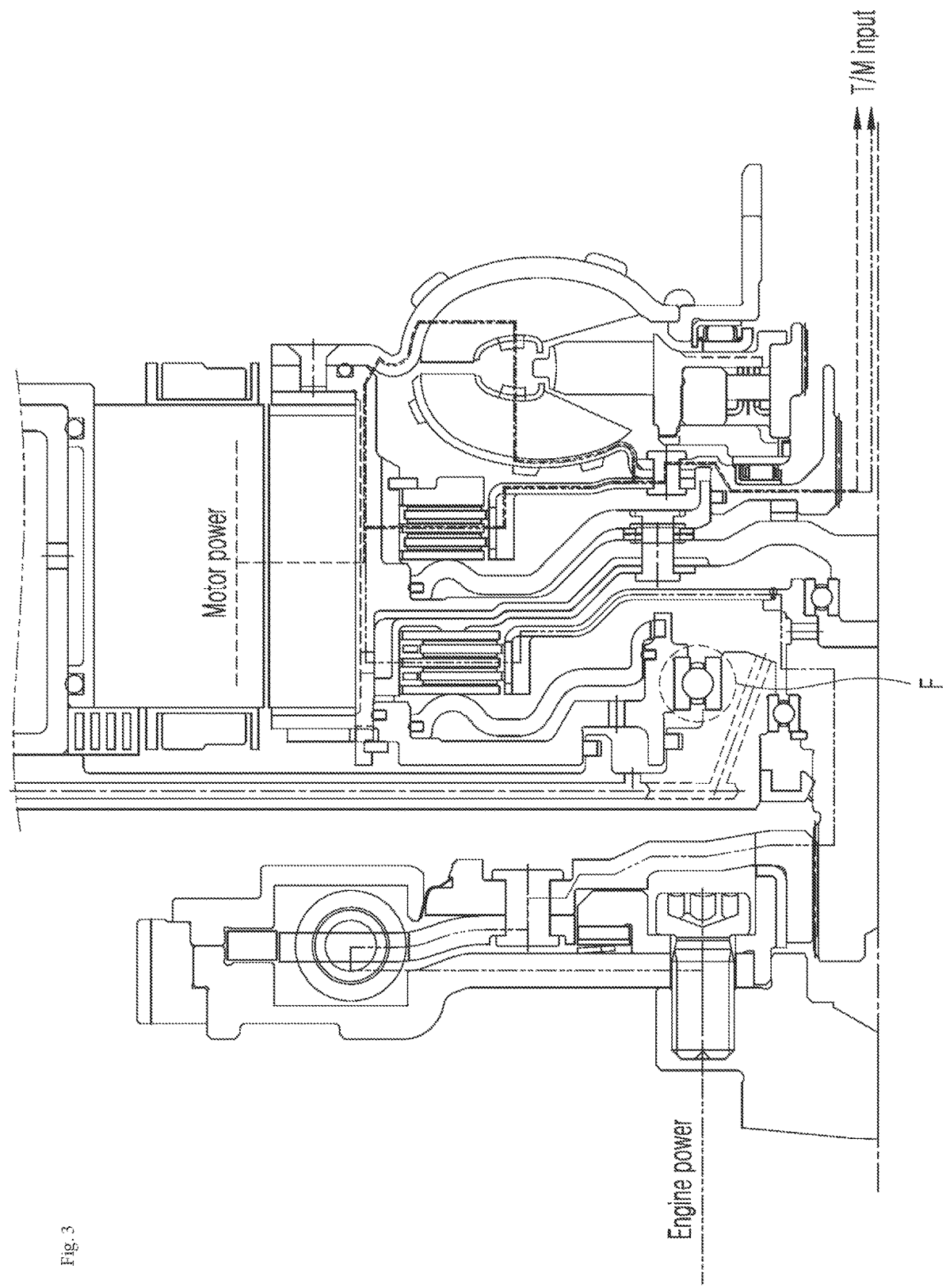
FIG. 3 is a view illustrating a transmission route of driving power in FIG. 1.
Figure 4:
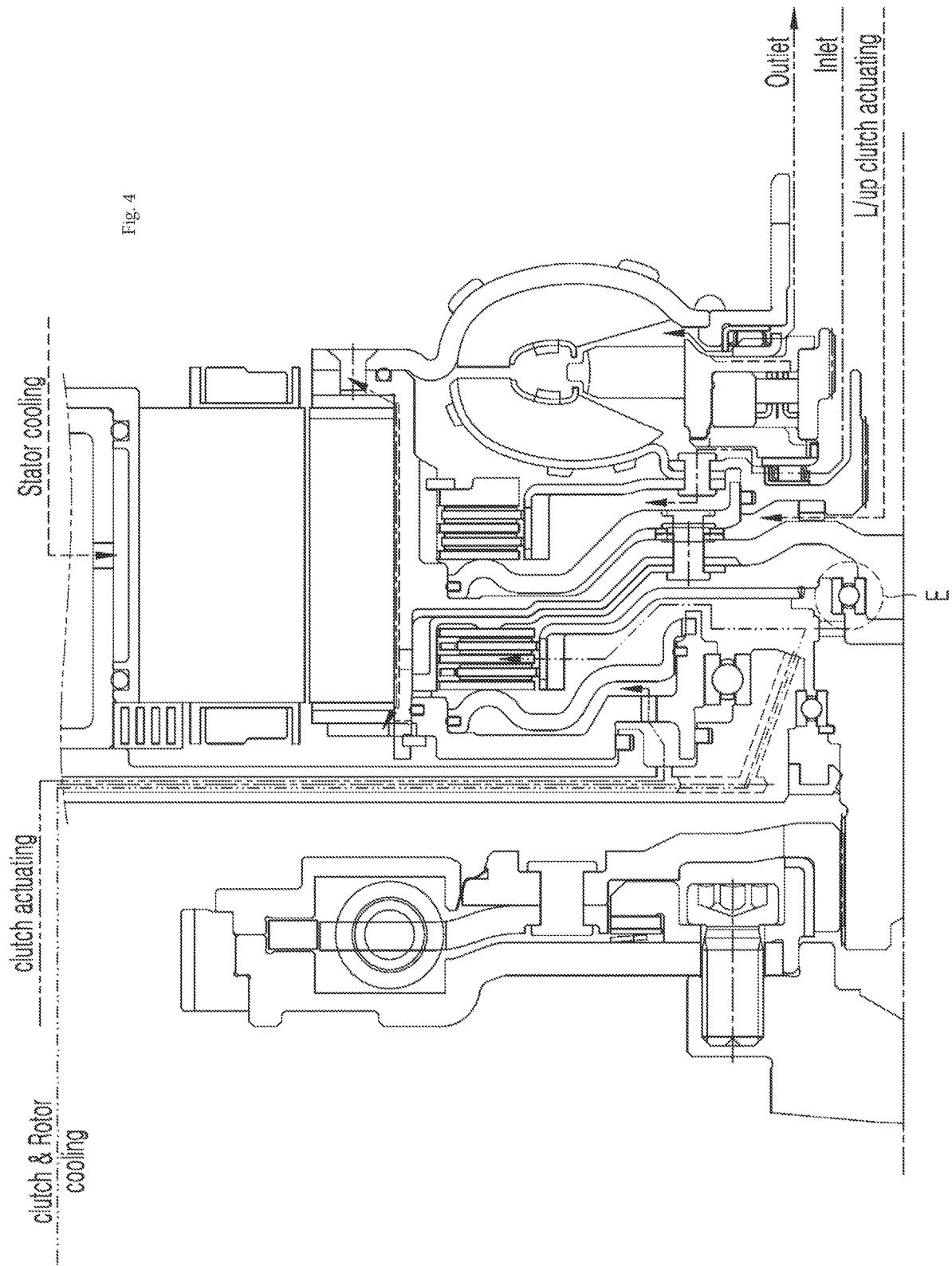
FIG. 4 is a view illustrating a flow control direction of a fluid in FIG. 1.

As indicated by a "clutch actuating" route illustrated in FIG. 4, when the fluid is introduced into the front space A1 of the first piston plate 21 through the housing 80, the first piston plate 21 moves axially rearward relative to the hub ridge 46 and presses the first clutch pack 22. That is, when hydraulic pressure is supplied to the first flow path 83, the oil, to which the pressure is applied, is supplied to the engine clutch operation chamber through the space A1 and the flow hole 467, the first piston plate 21 presses the first clutch pack 22 while moving rearward, and the engine clutch 20 connects the input plate 12 and the rotor hub 43 to restrict the mutual rotation. Then, as indicated by the "engine power" route in FIG. 3, a rotational force of the engine is transmitted to the rotor hub 43.

As indicated by the "clutch actuating" route illustrated in FIG. 4, when the fluid is introduced into the front space A1 of the first piston plate 21 through the housing 80 and the first piston plate 21 presses the first clutch pack 22, a pressing force applied by the first piston plate 21 to press the first clutch pack 22 pushes the rotor hub 43 rearward. Therefore, as illustrated in FIG. 4, when the hydraulic pressure is supplied to operate the engine clutch 20, the rotor hub 43 and the hub ridge 46 may move rearward relative to the housing 80, the input member 10, and the input plate 12. Then, the possibility that the slide protrusion 468 of the hub ridge 46 interferes with the input plate 12 cannot be ruled out. The present invention provides a structure for preventing an axial direction clearance of the rotor hub 43.

Meanwhile, a second flow path 84 is formed in the housing 80 to supply the fluid to a rear space A2 of the first piston plate 21. The second flow path 84 extends in the radial direction from the radial outer end of the housing 80 to a position corresponding to the second axial protruding portion 823, extends in the axial direction along the second axial protruding portion 823, and communicates with the rear space A2. Because the second flow path 84 and the first flow path 83 are formed at different positions based on a circumferential direction of the housing, the second flow path 84 defines an independent flow path without communicating with the housing 80.

As indicated by the "clutch & rotor cooling" route illustrated in FIG. 4, when the fluid is introduced into the rear space A2 of the first piston plate 21 through the second flow path 84 of the housing 80, the first piston plate 21 moves axially forward relative to the hub ridge 46 and does not press the first clutch pack 22. The fluid (oil) introduced into the rear space A2 through the second flow path 84 cools/lubricates the bearings B1, B2, and B3, cools/lubricates the engine clutch 20, and cools the rotor 42.

The radial inner side of the hub ridge 46 is rotatably connected to the housing 80. To this end, a second bearing B2 is interposed between an inner peripheral surface of the axial extension portion 464 provided at the radial inner side of the hub ridge 46 and an outer peripheral surface of the second axial protruding portion 823 provided at the radial inner side of the housing 80. A ridge stepped portion 469 is provided on the axial extension portion 464 of the hub ridge 46 and restricts a rear position of the second bearing B2. Therefore, an outer race of the second bearing B2 supports the hub ridge 46 in the radial direction and the axial direction. A housing stepped portion 828 is provided on the housing 80 and restricts a front position of the second bearing B2. Therefore, an inner race of the second bearing B2 supports the housing 80 in the radial direction and the axial direction. Therefore, the hub ridge 46 is supported on the housing 80 in the radial direction and forward in the axial direction.

Meanwhile, a retainer 420 may be installed at an axial front side and/or an axial rear side of the rotor 42 and protect and support the rotor 42. An outer end of the hub ridge 46 may adjoin the retainer 420.

According to the structure of the hub ridge 46 described above, the first piston plate 21 is installed and the hub ridge 46 fixes the rotor 42 during the process in which the hub ridge 46 is installed on the rotor hub 43. From another standpoint, it can be said that the rotor 42 restricts the axial rearward movement of the hub ridge 46.

That is, the axial forward separation of the hub ridge 46 may be restricted by the hub snap ring 49, and the axial rearward movement of the hub ridge 46 may be restricted by the radial support portion 441 and/or the rotor 42.

A clearance may be generated in the axial direction in the hub ridge 46 because of manufacturing errors of the radial support portion 441 and the hub ridge 46. That is, the hub ridge 46 may vibrate by moving in the axial direction, which may cause noise.

Therefore, the hybrid driving module may further include an elastic body 90 configured to elastically press the hub ridge 46 axially forward and push the hub ridge 46 toward the hub snap ring 49.

The elastic body 90 may be installed at any position where the elastic body 90 may appropriately push the hub ridge 46 toward the hub snap ring 49. FIG. 1 illustrates a structure in which first to fourth elastic bodies 91, 92, 93, and 94 are installed at different positions and press the hub ridge 46 toward the hub snap ring 49. However, this configuration is provided for the convenience of description, and the elastic body 90 may include only any one of the first to fourth elastic bodies 91, 92, 93, and 94. Of course, the elastic body 90 may include two or more elastic bodies 90 among the first to fourth elastic bodies 91, 92, 93, and 94.

The first elastic body 91 and/or the second elastic body 92 provide an elastic force in a direction in which the first elastic body 91 and/or the second elastic body 92 is expanded in the axial direction.

First, the first elastic body 91 may be configured to elastically press the hub ridge 46 forward from a front side of the rotor 42 and push the hub ridge 46 toward the hub snap ring 49. The second elastic body 92 may be configured to elastically press the rotor 42 and the hub ridge 46 forward from a rear side of the rotor 42 and push the hub ridge 46 toward the hub snap ring 49.

Therefore, the hub ridge 46 is pressed against the hub snap ring 49 by the first elastic body 91 and/or the second elastic body 92, and thus the hub ridge 46 does not vibrate or rattle. In addition, the rotor 42 may also be securely supported in the axial direction between the axial support portion 442 and the radius extension portion 462.

Next, the elastic body 90 may be configured to elastically press the piston installation portion 464 forward from the engine clutch 20 and push the hub ridge 46 toward the hub snap ring 49. The third elastic body 93 and the fourth elastic body 94 illustrated in FIG. 1 correspond to this configuration.

The third elastic body 93 may be interposed between the front end of the first carrier 23 and the hub ridge 46. Further, the third elastic body 93 provides an elastic force that elastically restore the third elastic body 93 in a direction in which the third elastic body 93 expands in the axial direction. Therefore, the first carrier 23 and the hub ridge 46 are elastically pressed by the third elastic body 93 in a direction in which the first carrier 23 and the hub ridge 46 move away from each other. Therefore, the hub ridge 46 is pushed against the hub snap ring 49.

The fourth elastic body 94 may be installed on the first clutch pack 22. The fourth elastic body 94 may serve as a return spring for the first piston plate 21. The fourth elastic body 94 is disposed between the plurality of clutch plates and spreads the clutch plates in a direction in which the first clutch pack 22 is spread in the axial direction. The elastic force of the fourth elastic body 94 pushes the first piston plate 21 against the hub ridge 46. Then, the hub ridge 46 is elastically pressed against the hub snap ring 49.

The elastic bodies 90, i.e., the first to fourth elastic bodies 91, 92, 93, and 94 may each be an annular disk spring or a wave washer. However, the type of spring is not limited thereto.

A back cover 52 is fixed to the axial support portion 442 of the rotor holder 44 by bolts 53. The back cover 52 extends radially inward from the rotor holder 44. A radial inner end of the back cover 52 is connected to an oil pump of the transmission. An impeller 51 is provided on a front surface of the back cover 52.

The output member 70 is provided between the hub plate 45 and the back cover 52. A spline is formed on an inner peripheral surface of the output member 70 and connected to a non-illustrated input shaft of the transmission. The output member 70 is integrally connected to a turbine plate 55. The turbine plate 55 extends in the radial direction. A turbine 54 is provided on a rear surface of the turbine plate 55 and faces the impeller 51 in the axial direction.

A fixed end 75 is disposed between the back cover 52 and the output member 70. A spline is formed on an inner peripheral surface of the fixed end 75 and connected to a non-illustrated fixed shaft of the transmission.

A reactor 56 is disposed between the impeller 51 and the turbine 54. The reactor 56 is connected to the fixed end 75 through a one-way clutch 57. The impeller 51, the turbine 54, and the reactor 56 constitute a torque converter configured to boost torque of the motor 40 and transmit the torque to the output member 70.

The output member 70 is supported to be rotatable relative to the fixed end 75 by a fourth bearing B4. The back cover 52 is supported to be rotatable relative to the fixed end 75 by a fifth bearing B5. Further, the hub plate 45 and the output member 70 are supported to be rotatable relative to each other by a sixth bearing B6.

A lock-up clutch 60 is installed rearward of the hub plate 45 and provided on an inner peripheral surface of the rotor holder 44. An output plate 64 is integrally connected to the output member 70 and rotates integrally with the output member 70. The output plate 64 extends radially from the output member 70 to the lock-up clutch 60.

The lock-up clutch 60 includes a second clutch pack 62 having a friction plate or a friction member. The second clutch pack 62 is disposed between the rotor hub 43 and the output plate 64.

A second piston plate 61 is disposed at an axial front side of the second clutch pack 62. When the second piston plate 61 presses the second clutch pack 62 in the axial direction, the rotor hub 43 and the output plate 64 are connected so that the mutual rotations thereof are restricted. Therefore, a rotational force of the rotor hub 43 may be transmitted to the output plate 64 and the output member 70 via the lock-up clutch 60. When the second piston plate 61 does not press the second clutch pack 62, the mutual rotations of the rotor hub 43 and the output plate 64 are not restricted. Therefore, a rotational force of the rotor hub 43 is transmitted to the output member 70 through the torque converter.

The second piston plate 61 extends in the radial direction. An outer peripheral surface of a radial outer side of the second piston plate 61 and the inner peripheral surface of the rotor holder 44 face each other and slidably adjoin each other in the axial direction. An inner peripheral surface of a radial inner side of the second piston plate 61 and an outer peripheral surface of the output member 70 face each other and slidably adjoin each other in the axial direction.

As indicated by the "inlet" route illustrated in FIG. 4, when the fluid is introduced into a rear space A3 of the second piston plate 61 through the transmission, the second piston plate 61 moves axially forward relative to the rotor holder 44 and does not press the second clutch pack 62.

As indicated by the "L/up clutch actuating" route illustrated in FIG. 4, when the fluid is introduced into a front space A4 of the second piston plate 61 through the transmission, the first piston plate 21 moves axially backward relative to the rotor holder 44 and presses the second clutch pack 62.

Hereinafter, a driving operation of the hybrid driving module will be described with reference to FIG. 3.

First, the engine clutch 20 does not transmit power between the input plate 12 and the first carrier 23 when the motor 40 provides driving power but the engine does not provide driving power. When it is necessary to boost torque of the motor 40 and transmit the torque to the transmission, i.e., when a rotational speed of the motor 40 is higher than a rotational speed of the output member 70, the torque of the motor 40 is boosted by the torque converter and transmitted to the output member 70. Therefore, when the rotational speed of the output member 70 becomes close to the rotational speed of the motor 40, the lock-up clutch 60 operates, and the rotor hub 43 and the output member 70 are connected directly to each other.

Meanwhile, when the engine provides driving power or when the engine and the motor 40 provide driving power, the engine clutch 20 transmits power between the input plate 12 and the first carrier 23. Then, the torque of the engine and the torque of the motor 40 are combined and transmitted to the output member 70 through the torque converter. The torque of the engine and the torque of the motor 40 may be boosted by the torque converter and transmitted to the output member 70. When a speed ratio (SR) between the rotor hub 43 and the output member 70 is 1:1, the rotor hub 43 and the output member 70 are connected directly to each other by the lock-up clutch 60. That is, the torque converter and the lock-up clutch 60 constitute a power transmission part configured to transmit power between the rotor hub 43 and the output member 70.

According to the hybrid driving module according to the embodiment, the torque of the engine is transmitted to the rotor hub 43 through the input plate 12, the engine clutch 20, and the first carrier 23, and the hub ridge 46 is not in the torque transmission route.

[Structure for Preventing Axial Clearance of Rotor Hub]

In the case of the rotor hub 43 and the hub ridge 46, which have been described above, the possibility that a clearance occurs in the axial direction on the housing 80 and the input member 10 cannot be ruled out. The embodiment provides the structure for preventing the axial clearance.

In particular, to provide the clearance prevention structure of the present invention, a mounting structure of the third bearing B3 for supporting the relative rotation between the rotor hub 43 and the input member 10 is used or a mounting structure of the second bearing B2 for supporting the relative rotation between the hub ridge 46 and the housing 80 is used. Therefore, a separate additional thrust bearing element is not required.

As axial movement prevention parts for preventing the rotor hub 43 (the concept including the hub ridge) from moving in the axial direction because a clearance occurs in the axial direction on the housing 80 (the concept including the input member), a first embodiment illustrated in FIGS. 5 and 6 and second to fourth embodiments respectively illustrated in FIGS. 7 to 9 will be described.

The axial movement prevention part prevents the rotor hub 43 from moving forward or rearward relative to the housing 80. That is, the axial movement prevention part may remove or minimize the axial clearance of the rotor hub 43 with respect to the housing 80.

First Embodiment

Figure 5:
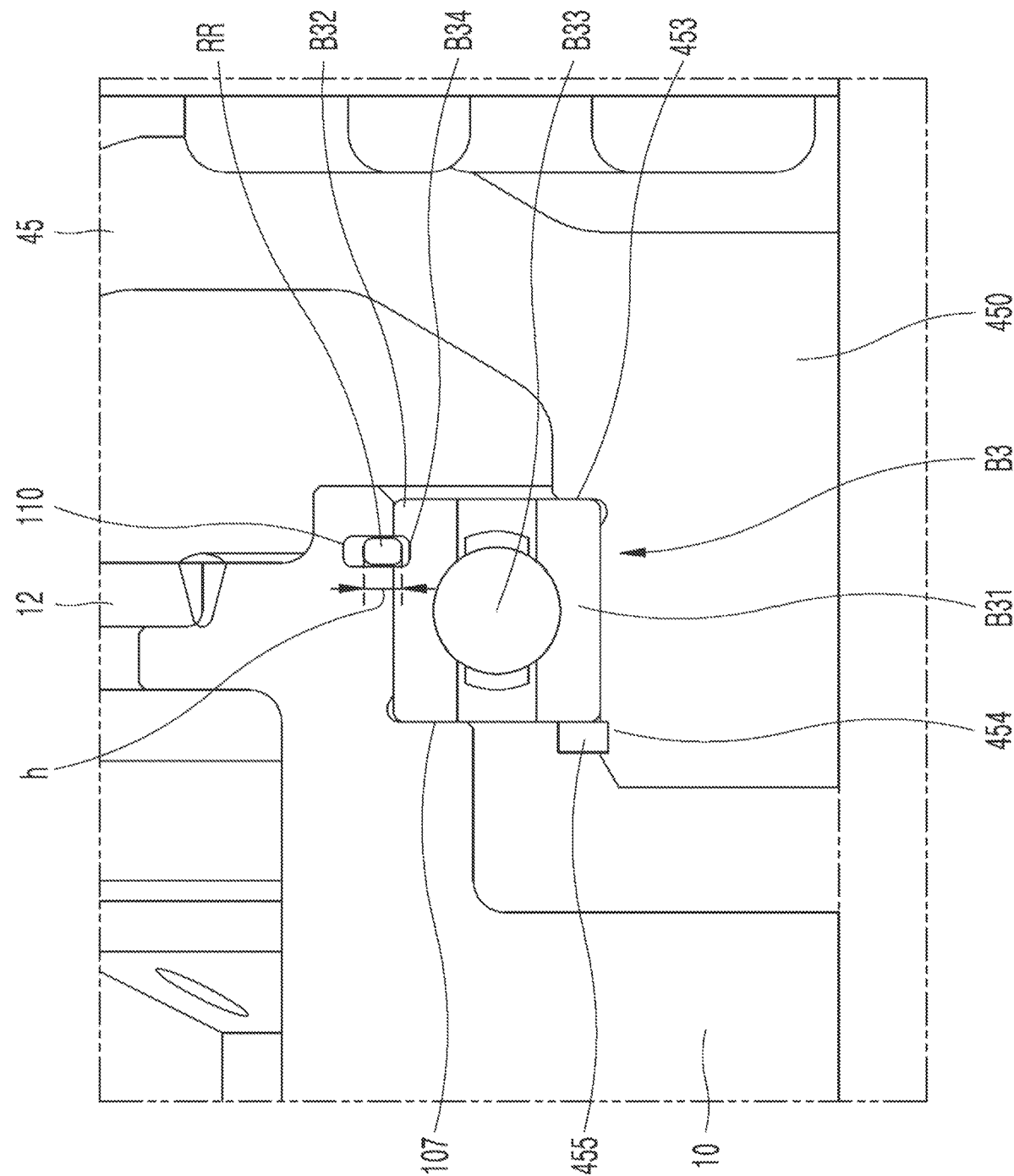
FIG. 5 is an enlarged view of (part E in FIG. 4) a first embodiment of an axial movement prevention part.
Figure 6:
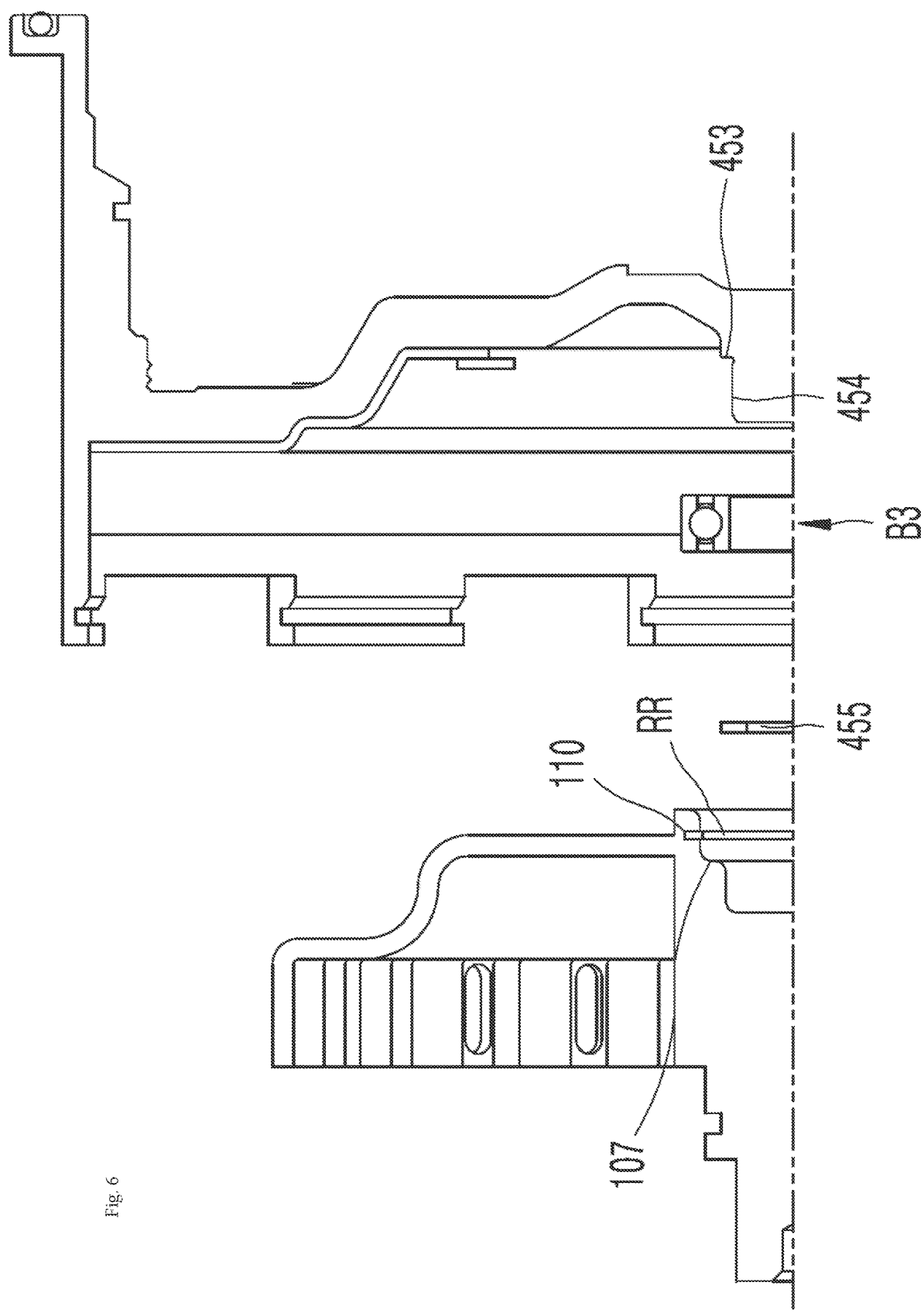
FIG. 6 is an exploded view of the axial movement prevention part in FIG. 5.

With reference to FIG. 5 and FIG. 6, the axial movement prevention part according to the first embodiment is applied to a structure for installing the third bearing B3.

The third bearing B3 includes an annular third inner race B31 disposed at a radial inner side, a third outer race B32 configured to face the third inner race B31 in the radial direction and spaced radially outward apart from the third inner race B31, and a third rolling element B33 interposed between the third inner race B31 and the third outer race B32. The third rolling element B33 may be a ball body, and the third bearing B3 may be a ball bearing. The third bearing B3 may support the rotations in the radial direction and the axial direction.

The central axis extension portion 450 of the hub plate 45 of the rotor hub 43 extends axially forward from the hub plate 45. The central axis stepped portion 453 is provided on the outer peripheral surface of the central axis extension portion 450. Based on the central axis stepped portion 453, a front diameter of the central axis extension portion 450 is smaller than a rear diameter of the central axis extension portion 450.

An inner peripheral surface of the third inner race B31 and an outer peripheral surface of the central axis extension portion 450 adjoin each other while facing each other in the radial direction. Further, a rear end of the third inner race B31 adjoins the central axis stepped portion 453 while facing the central axis stepped portion 453 in the axial direction.

In the state in which the third inner race B31 adjoins the central axis stepped portion 453, a central axis snap ring 455 is installed at a side positioned forward of the third inner race B31. A first central axis ring groove 454 is formed in a portion of the outer peripheral surface of the central axis extension portion 450 that is disposed immediately forward of the third inner race B31. The central axis snap ring 455 is inserted into the first central axis ring groove 454. That is, a position at the rear side of the third inner race B31 is restricted by the central axis stepped portion 453. A position at the front side of the third inner race B31 is restricted by the first central axis ring groove 454 and the central axis snap ring 455.

A hollow portion is provided at a rear side of the input member 10. Further, the central axis extension portion 450 is accommodated in the hollow portion provided at the rear side of the input member 10. An inner peripheral surface, which defines the hollow portion, is provided at the rear side of the input member 10. The second input member stepped portion 107 is provided on the inner peripheral surface of the input member 10. Based on the second input member stepped portion 107, a front inner diameter of the input member 10 is smaller than a rear inner diameter of the input member 10.

The outer peripheral surface of the third outer race B32 and the inner peripheral surface of the input member 10 adjoin each other while facing each other in the radial direction. Further, the front end of the third outer race B32 and the second input member stepped portion 107 adjoin each other while facing each other in the axial direction.

A third bearing groove B34 is formed in an outer peripheral surface of the third outer race B32. Further, a third input member ring groove 110 is formed in a portion where the inner peripheral surface of the input member 10 faces the third bearing groove B34 in the state in which the third outer race B32 adjoins the second input member stepped portion 107. Therefore, the third bearing groove B34 and the third input member ring groove 110 are connected to communicate with each other in the radial direction.

A clearance prevention ring RR is fitted with the third bearing groove B34 and the third input member ring groove 110. The clearance prevention ring RR may be a C-ring that may be elastically deformed so that a radius thereof increases or decreases.

A depth of the third input member ring groove 110, which is measured in the radial direction, may be equal to or larger than a height h of the clearance prevention ring RR that is measured in the radial direction. In contrast, a depth of the third bearing groove B34 may be smaller than the height of the clearance prevention ring RR.

The process of installing the third bearing B3 to which the axial movement prevention part is applied will be described with reference to FIG. 6.

First, the third inner race B31 of the third bearing B3 is externally inserted into the outer peripheral surface of the central axis extension portion 450 until the third inner race B31 reaches the central axis stepped portion 453. Further, the central axis snap ring 455 is inserted into the first central axis ring groove 454 disposed immediately forward of the third inner race B31.

Next, the clearance prevention ring RR is fitted into the third input member ring groove 110 provided in the inner peripheral surface of the input member 10. During the process of fitting the clearance prevention ring RR into the third input member ring groove 110, the clearance prevention ring RR is elastically deformed so that an outer diameter thereof decreases. At the moment when the clearance prevention ring RR reaches the third input member ring groove 110, the clearance prevention ring RR is elastically restored so that the outer diameter thereof increases, such that the clearance prevention ring RR is fitted with the third input member ring groove 110. In the state in which the clearance prevention ring RR is fitted with the third input member ring groove 110, a radial inner end of the clearance prevention ring RR further protrudes radially inward than the inner peripheral surface of the input member 10.

In this state, the input member 10 is externally inserted into the outer peripheral surface of the central axis extension portion 450. Then, the third outer race B32 of the third bearing B3 elastically deforms the clearance prevention ring RR so that a radius thereof increases. Because the depth of the third input member ring groove 110 is equal to or larger than the height of the clearance prevention ring RR, the clearance prevention ring RR may be completely inserted into the third input member ring groove 110. To implement a more smooth assembling process, an edge portion between the front surface and the outer peripheral surface of the third outer race B32 may have a tapered shape or a chamfer shape.

The clearance prevention ring RR with the increased radius is elastically restored at the moment when the clearance prevention ring RR reaches the third bearing groove B34, and an inner diameter thereof decreases, such that the clearance prevention ring RR is fitted with the third bearing groove B34. In the state in which the clearance prevention ring RR is fitted with the third bearing groove B34, the radial outer end of the clearance prevention ring RR is kept fitted with the third input member ring groove 110.

Then, as illustrated in FIG. 5, the installation of the third bearing B3 is completed.

In this case, even in a case in which hydraulic pressure is supplied to the first space A1 to operate the engine clutch 20, the first piston plate 21 receives pressure to the rear side, and the rotor hub 43 is intended to move rearward, the central axis snap ring 455 interferes with the third inner race B31, the third inner race B31 interferes with the third rolling element B33, the third rolling element B33 interferes with the third outer race B32, the third outer race B32 interferes with the clearance prevention ring RR, and the clearance prevention ring RR interferes with the input member 10, such that the rearward movement of the rotor hub 43 is prevented.

Meanwhile, even in a case in which hydraulic pressure is supplied to the fourth space A4 to operate the lock-up clutch 60, and the rotor hub 43 is intended to move forward, the central axis stepped portion 453 interferes with the third inner race B31, the third inner race B31 interferes with the third rolling element B33, the third rolling element B33 interferes with the third outer race B32, the third outer race B32 interferes with the clearance prevention ring RR, and the clearance prevention ring RR interferes with the input member 10, such that the forward movement of the rotor hub 43 is prevented.

As described above, the clearance prevention ring RR, the third bearing groove B34, and the third input member ring groove 110 serve as the axial movement prevention parts and prevent the forward/rearward clearance of the rotor hub 43.

Second Embodiment

The description will be focused on a difference between the first and second embodiments.

Figure 7:
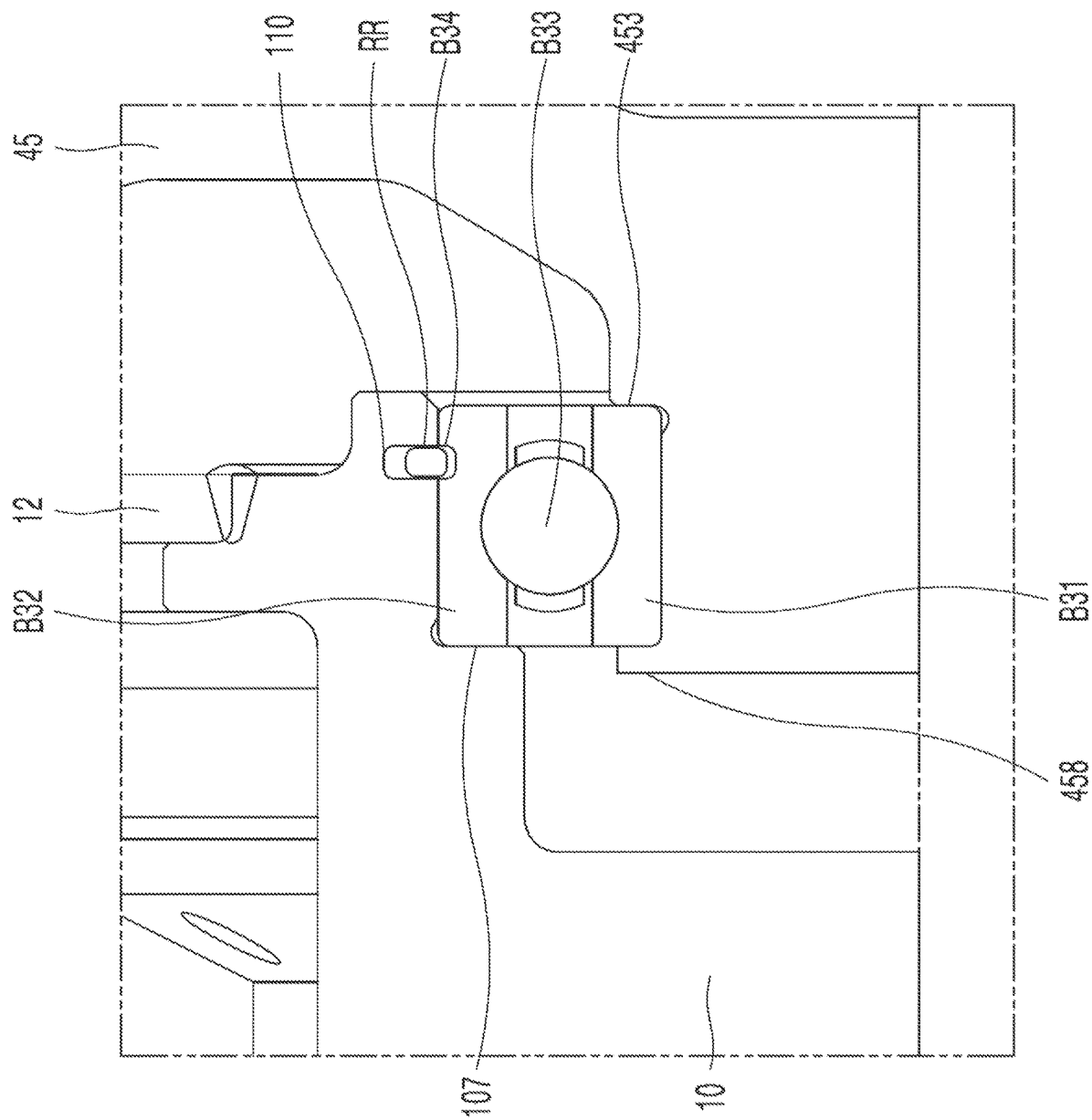
FIG. 7 is an enlarged view of (part E in FIG. 4) a second embodiment of the axial movement prevention part.

With reference to FIG. 7, unlike the first embodiment in which the first central axis ring groove 454 and the central axis snap ring 455 are applied as bearing fixing parts, there is a difference in that a caulking part 458, which is a plastic processing part, is applied as a bearing fixing part in the second embodiment.

In the state in which the third inner race B31 adjoins the central axis stepped portion 453, the caulking part 458 is processed at a position positioned forward of the third race. The caulking part 458 eventually increases the outer diameter of the central axis extension portion 450. Therefore, a position at the front side of the third inner race B31 is restricted by the plastic processing part, i.e., the caulking part 458.

A difference between the first and second embodiments in terms of the method of installing the third bearing B3 to which the axial movement prevention part is applied to will be described.

The second embodiment differs from the first embodiment in that the third inner race B31 of the third bearing B3 is externally inserted into the outer peripheral surface of the central axis extension portion 450 until the third inner race B31 reaches the central axis stepped portion 453, and then the central axis extension portion 450 positioned immediately forward of the third inner race B31 is caulking-processed, such that the front side of the third inner race B31 is fixed.

According to the second embodiment, even in a case in which hydraulic pressure is supplied to the first space A1 to operate the engine clutch 20, the first piston plate 21 receives pressure to the rear side, and the rotor hub 43 is intended to move rearward, the caulking part 458 interferes with the third inner race B31, the third inner race B31 interferes with the third rolling element B33, the third rolling element B33 interferes with the third outer race B32, the third outer race B32 interferes with the clearance prevention ring RR, and the clearance prevention ring RR interferes with the input member 10, such that the rearward movement of the rotor hub 43 is prevented.

Third Embodiment

With reference to FIG. 7, there is a greatest difference between the first and third embodiments in that the clearance prevention ring RR is applied to the third inner race B31. Furthermore, there are subsidiary differences that result from the above-mentioned difference. Hereinafter, the third embodiment will be described, focusing on the difference.

In the state in which the third outer race B32 adjoins the second input member stepped portion 107, a second input member snap ring 109 is installed at a side positioned rearward of the third outer race B32. A second input member ring groove 108 is formed at a portion of the inner peripheral surface of the input member 10 that is positioned immediately rearward of the third outer race B32, and the second input member snap ring 109 is inserted into the second input member ring groove 108. That is, a position at the front side of the third outer race B32 is restricted by the second input member stepped portion 107, and a position at the rear side of the third outer race B32 is restricted by the second input member ring groove 108 and the second input member snap ring 109. Of course, similar to the second embodiment, the front end of the input member 10 may be caulking-processed to form the bearing fixing part.

The third bearing groove B34 is formed in the inner peripheral surface of the third inner race B31. Further, a second central axis ring groove 459 is formed in a portion where the outer peripheral surface of the central axis extension portion 450 faces the third bearing groove B34 in the state in which the third inner race B31 adjoins the central axis stepped portion 453. Therefore, the third bearing groove B34 and the second central axis ring groove 459 are connected to communicate with each other in the radial direction.

The clearance prevention ring RR is fitted with the third bearing groove B34 and the second central axis ring groove 459.

A depth of the second central axis ring groove 459, which is measured in the radial direction, may be equal to or larger than the height h of the clearance prevention ring RR that is measured in the radial direction. In contrast, a depth of the third bearing groove B34 may be smaller than the height of the clearance prevention ring RR.

The process of installing the third bearing B3 to which the axial movement prevention part is applied will be described below.

First, the third outer race B32 of the third bearing B3 is internally inserted into the inner peripheral surface of the input member 10 until the third outer race B32 reaches the second input member stepped portion 107. Further, the second input member snap ring 109 is inserted into the second input member ring groove 108 positioned immediately rearward of the third outer race B32.

Next, the clearance prevention ring RR is fitted into the second central axis ring groove 459 provided in the outer peripheral surface of the central axis extension portion 450. During the process of fitting the clearance prevention ring RR into the second central axis ring groove 459, the clearance prevention ring RR is elastically deformed so that an inner diameter thereof increases. At the moment when the clearance prevention ring RR reaches the second central axis ring groove 459, the clearance prevention ring RR is elastically restored so that the inner diameter thereof decreases, such that the clearance prevention ring RR is fitted with the second central axis ring groove 459. In the state in which the clearance prevention ring RR is fitted with the second central axis ring groove 459, the radial outer end of the clearance prevention ring RR further protrudes radially outward than the outer peripheral surface of the central axis extension portion 450.

In this state, the input member 10 is externally inserted into the outer peripheral surface of the central axis extension portion 450. Then, the third inner race B31 of the third bearing B3 elastically deform the clearance prevention ring RR so that a radius thereof decreases. Because the depth of the second central axis ring groove 459 is equal to or larger than the height of the clearance prevention ring RR, the clearance prevention ring RR may be completely inserted into the second central axis ring groove 459. To implement a more smooth assembling process, an edge portion between the rear surface and the inner peripheral surface of the third inner race B31 may have a tapered shape or a chamfer shape.

The clearance prevention ring RR with the decreased radius is elastically restored at the moment when the clearance prevention ring RR reaches the third bearing groove B34, and an outer diameter thereof increases, such that the clearance prevention ring RR is fitted with the third bearing groove B34. In the state in which the clearance prevention ring RR is fitted with the third bearing groove B34, the radial inner end of the clearance prevention ring RR is kept fitted with the second central axis ring groove 459.

Figure 8:
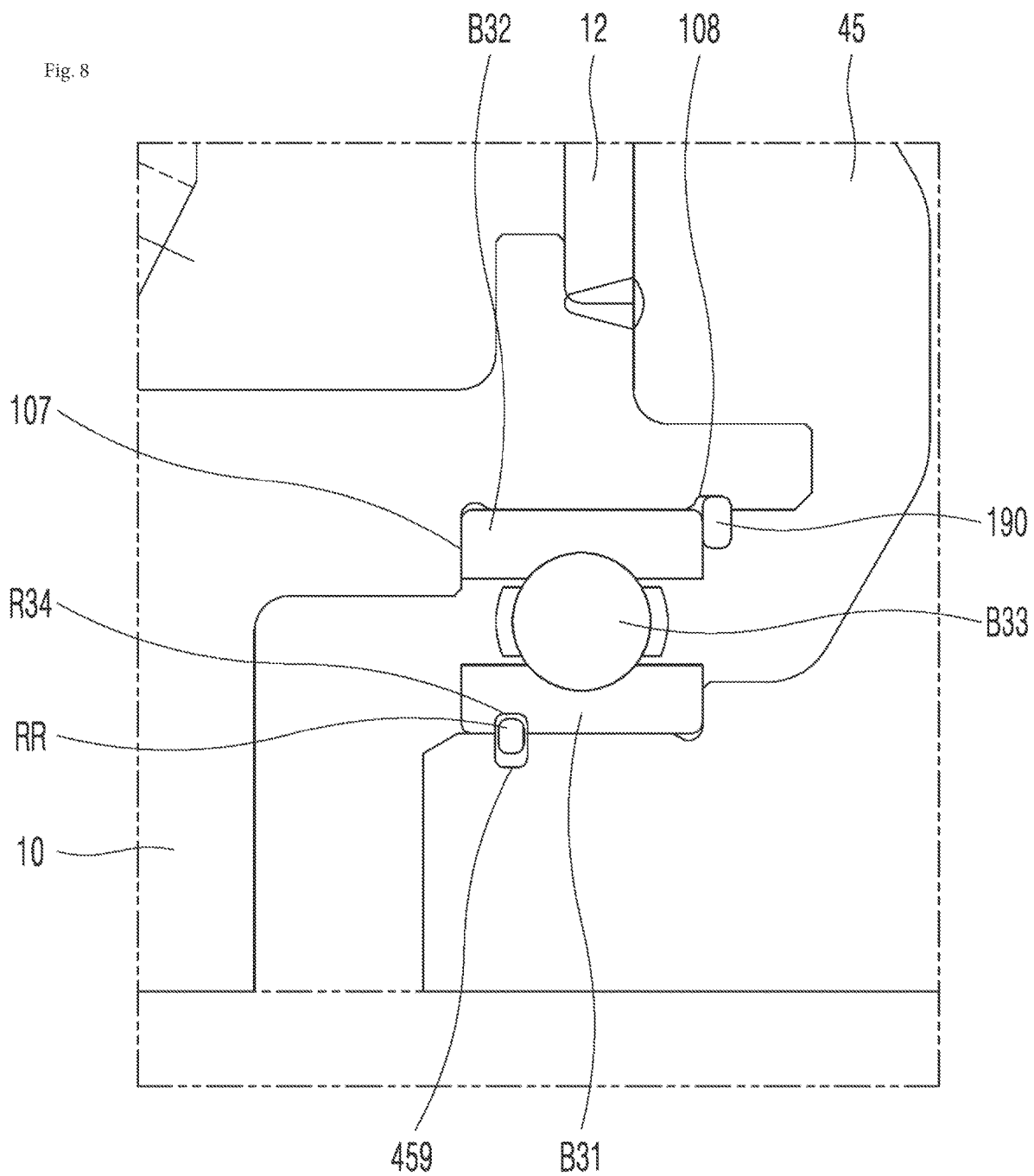
FIG. 8 is an enlarged view of (part E in FIG. 4) a third embodiment of the axial movement prevention part.

Then, as illustrated in FIG. 8, the installation of the third bearing B3 is completed.

In this case, even in a case in which hydraulic pressure is supplied to the first space A1 to operate the engine clutch 20, the first piston plate 21 receives pressure to the rear side, and the rotor hub 43 is intended to move rearward, the central axis extension portion 450 interferes with the clearance prevention ring RR, the clearance prevention ring RR interferes with the third inner race B31, the third inner race B31 interferes with the third rolling element B33, the third rolling element B33 interferes with the third outer race B32, and the third outer race B32 interferes with the second input member snap ring 109, such that the rearward movement of the rotor hub 43 is prevented.

Meanwhile, even in a case in which hydraulic pressure is supplied to the fourth space A4 to operate the lock-up clutch 60, and the rotor hub 43 is intended to move forward, the central axis extension portion 450 interferes with the clearance prevention ring RR, the clearance prevention ring RR interferes with the third inner race B31, the third inner race B31 interferes with the third rolling element B33, the third rolling element B33 interferes with the third outer race B32, and the third outer race B32 interferes with the second input member stepped portion 107, such that the forward movement of the rotor hub 43 is prevented.

As described above, the clearance prevention ring RR, the third bearing groove B34, and the second central axis ring groove 459 serve as the axial movement prevention parts and prevent the forward/rearward clearance of the rotor hub 43.

The first to third embodiments have been described on the assumption that the outer peripheral surface of the central axis extension portion 450 is disposed at a side positioned radially inward of the inner peripheral surface of the input member 10.

However, the present invention is not limited thereto. The present invention may, of course, be applied to a structure in which a hollow portion may be provided in the central axis extension portion 450, and a rear end of the input member 10 is fitted into the hollow portion of the central axis extension portion 450, such that the outer peripheral surface of the input member 10 may be disposed at a side positioned radially inward of the inner peripheral surface of the central axis extension portion 450.

Fourth Embodiment

Figure 9:
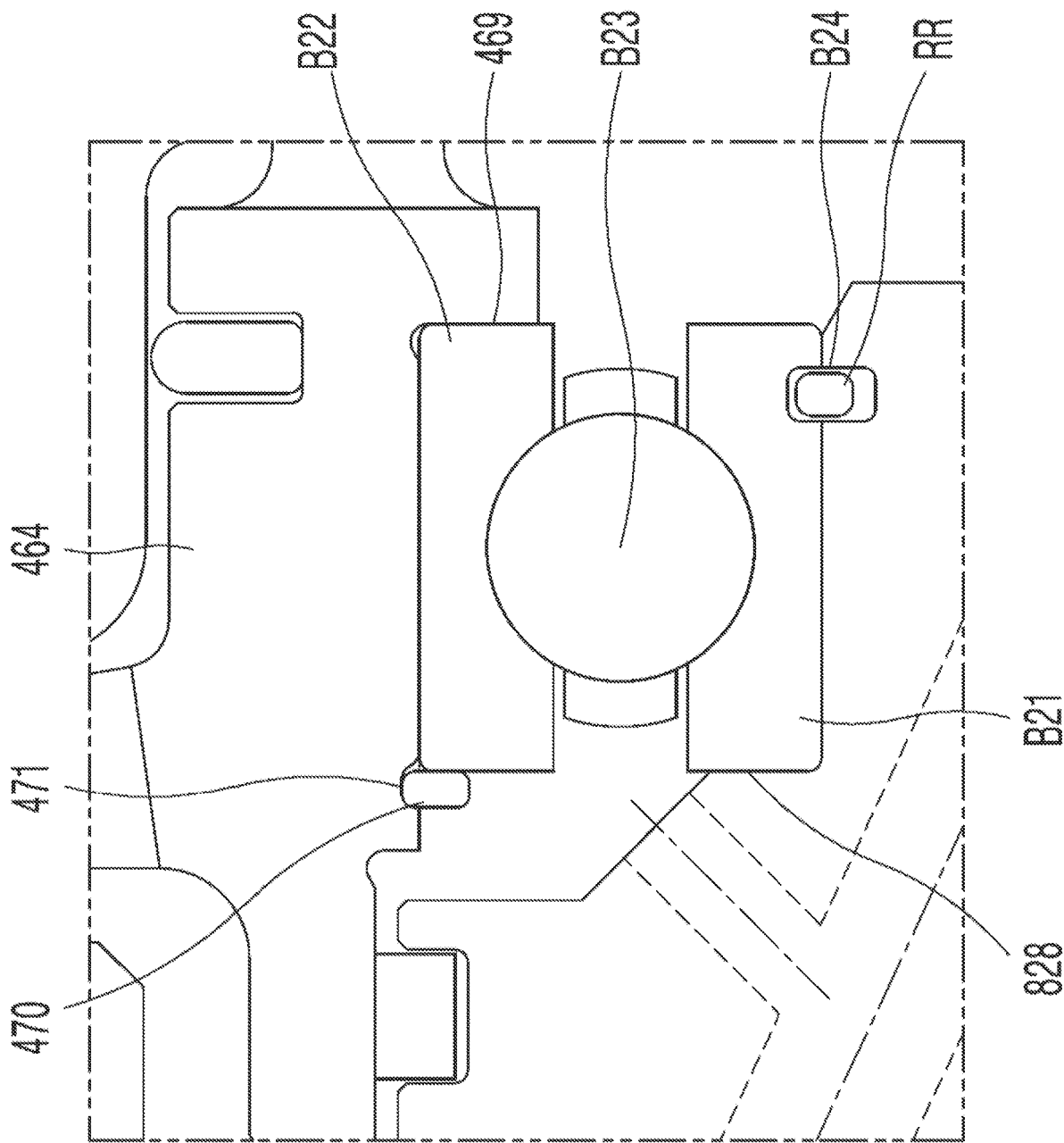
FIG. 9 is an enlarged view of (part F in FIG. 3) a fourth embodiment of the axial movement prevention part.

With reference to FIG. 9, the axial movement prevention part according to the fourth embodiment is applied to a structure for installing the second bearing B2.

The second bearing B2 includes an annular second inner race B21 disposed at a radial inner side, a second outer race B22 configured to face the second inner race B21 in the radial direction and spaced radially outward apart from the second inner race B21, and a second rolling element B23 interposed between the second inner race B21 and the second outer race B22. The second rolling element B23 may be a ball body, and the second bearing B2 may be a ball bearing. The second bearing B2 may support the rotations in the radial direction and the axial direction.

The axial extension portion 464 of the hub ridge 46 of the rotor hub 43 extends axially rearward from the hub ridge 46. The ridge stepped portion 469 is provided on the inner peripheral surface of the axial extension portion 464. Based on the ridge stepped portion 469, a front inner diameter of the axial extension portion 464 is larger than a rear inner diameter of the axial extension portion 464.

The outer peripheral surface of the second outer race B22 and the inner peripheral surface of the axial extension portion 464 adjoin each other while facing each other in the radial direction. Further, a rear end of the second outer race B22 adjoins the ridge stepped portion 469 while facing the ridge stepped portion 469 in the axial direction.

In the state in which the second outer race B22 adjoins the ridge stepped portion 469, a ridge snap ring 470 is installed at a side positioned forward of the second outer race B22. A ridge ring groove 471 is formed in a portion of the inner peripheral surface of the axial extension portion 464 that is disposed immediately forward of the second outer race B22, and the ridge snap ring 470 is inserted into the ridge ring groove 471. That is, a position at the rear side of the second outer race B22 is restricted by the ridge stepped portion 469, and a position at the front side of the second outer race B22 is restricted by the ridge ring groove 471 and the ridge snap ring 470.

The second axial protruding portion 823 includes a portion further extending radially inward in the axial direction than the axial extension portion 464. Therefore, at least a partial section of the outer peripheral surface of the second axial protruding portion 823 faces at least a partial section of the inner peripheral surface of the axial extension portion 464 in the radial direction. The housing stepped portion 828 is provided on the outer peripheral surface of the second axial protruding portion 823. Based on the housing stepped portion 828, a rear outer diameter of the second axial protruding portion 823 is smaller than a front outer diameter of the second axial protruding portion 823.

The inner peripheral surface of the second inner race B21 and the outer peripheral surface of the second axial protruding portion 823 adjoin each other while facing each other in the radial direction. Further, the front end of the second inner race B21 and the housing stepped portion 828 adjoin each other while facing each other in the axial direction.

A second bearing groove B24 is formed in the inner peripheral surface of the second inner race B21. Further, a housing ring groove 829 is formed in a portion where the outer peripheral surface of the second axial protruding portion 823 faces the second bearing groove B24 in the state in which the second outer race B22 adjoins the housing stepped portion 828. Therefore, the second bearing groove B24 and the housing ring groove 829 are connected to communicate with each other in the radial direction.

The clearance prevention ring RR is fitted with the second bearing groove B24 and the housing ring groove 829. The clearance prevention ring RR may be a C-ring that may be elastically deformed so that a radius thereof increases or decreases.

A depth of the housing ring groove 829, which is measured in the radial direction, may be equal to or larger than the height h of the clearance prevention ring RR that is measured in the radial direction. In contrast, a depth of the second bearing groove B24 may be smaller than the height of the clearance prevention ring RR.

The process of installing the second bearing B2 to which the axial movement prevention part is applied will be described below.

First, the second outer race B22 of the second bearing B2 is internally inserted into the inner peripheral surface of the axial extension portion 464 until the second outer race B22 reaches the ridge stepped portion 469. Further, the ridge snap ring 470 is inserted into the ridge ring groove 471 disposed immediately forward of the second outer race B22.

Next, the clearance prevention ring RR is fitted into the housing ring groove 829 positioned in the outer peripheral surface of the second axial protruding portion 823. During the process of fitting the clearance prevention ring RR into the housing ring groove 829, the clearance prevention ring RR is elastically deformed so that an inner diameter thereof increases. At the moment when the clearance prevention ring RR reaches the housing ring groove 829, the clearance prevention ring RR is elastically restored so that the inner diameter thereof decreases, such that the clearance prevention ring RR is fitted with the housing ring groove 829. In the state in which the clearance prevention ring RR is fitted with the housing ring groove 829, the radial outer end of the clearance prevention ring RR further protrudes radially outward than the outer peripheral surface of the second axial protruding portion 823.

In this state, the second axial protruding portion 823 is internally inserted into the inner peripheral surface of the axial extension portion 464. Then, the second inner race B21 of the second bearing B2 elastically deform the clearance prevention ring RR so that a radius thereof decreases. Because the depth of the housing ring groove 829 is equal to or larger than the height of the clearance prevention ring RR, the clearance prevention ring RR may be completely inserted into the housing ring groove 829. To implement a more smooth assembling process, an edge portion between the front surface and the inner peripheral surface of the second inner race B21 may have a tapered shape or a chamfer shape.

The clearance prevention ring RR with the decreased radius is elastically restored at the moment when the clearance prevention ring RR reaches the second bearing groove B24, and an outer diameter thereof increases, such that the clearance prevention ring RR is fitted with the second bearing groove B24. In the state in which the clearance prevention ring RR is fitted with the second bearing groove B24, the radial inner end of the clearance prevention ring RR is kept fitted with the housing ring groove 829.

As illustrated in FIG. 9, the installation of the second bearing B2 is completed through the above-mentioned processes.

In this case, even in a case in which hydraulic pressure is supplied to the first space A1 to operate the engine clutch 20, the first piston plate 21 receives pressure to the rear side, and the rotor hub 43 is intended to move rearward, the ridge snap ring 470 interferes with the second outer race B22, the second outer race B22 interferes with the second rolling element B23, the second rolling element B23 interferes with the second inner race B21, the second inner race B21 interferes with the clearance prevention ring RR, and the clearance prevention ring RR interferes with the second axial protruding portion 823, such that the rearward movement of the rotor hub 43 is prevented.

Meanwhile, even in a case in which hydraulic pressure is supplied to the fourth space A4 to operate the lock-up clutch 60, and the rotor hub 43 is intended to move forward, the ridge stepped portion 469 interferes with the second outer race B22, the second outer race B22 interferes with the second rolling element B23, the second rolling element B23 interferes with the second inner race B21, the second inner race B21 interferes with the clearance prevention ring RR, and the clearance prevention ring RR interferes with the second axial protruding portion 823, such that the forward movement of the rotor hub 43 is prevented.

As described above, the clearance prevention ring RR, the second bearing groove B24, and the housing ring groove 829 serve as the axial movement prevention parts and prevent the forward/rearward clearance of the rotor hub 43.

Like the second and third embodiments that are modified examples of the first embodiment, even in the fourth embodiment, the plastic processing part 458, such as the caulking part, may be formed as a substitute for the ridge ring groove 471 and the ridge snap ring 470, or the second bearing groove B24 may be provided in the second outer race B22 instead of the second inner race B21.

Further, like the modified example of the first to third embodiments, even in the fourth embodiment, the second axial protruding portion may be disposed at a side positioned radially outward of the axial extension portion of the hub ridge 46.

While the present invention has been described above with reference to the accompanying drawings, the present invention is not limited to the drawings and the embodiments disclosed in the present specification, and it is apparent that the present invention may be variously changed by those skilled in the art without departing from the technical spirit of the present invention. Further, even though the operational effects of the configurations of the present invention have not been explicitly disclosed and described in the description of the embodiment of the present invention, the effects, which can be expected by the corresponding configurations, should, of course, be acceptable.

The invention claimed is:

1. A hybrid driving module, which has a motor including a rotor and a stator, the hybrid driving module comprising:
    a housing in which the stator is installed;
    a rotor hub on which the rotor is installed, the rotor hub being configured to be rotatably supported by the housing; and
    an axial movement prevention part configured to restrict forward and rearward movements of the rotor hub relative to the housing between the housing and the rotor hub,
    wherein the axial movement prevention part is provided in a bearing or interposed between the housing and the rotor hub and configured to support a rotation of the rotor hub relative to the housing,
    wherein the bearing is interposed between a peripheral surface at a side of the housing and a peripheral surface at a side of the rotor hub that face each other in a radial direction,
    wherein the bearing comprises:
        a first race configured to adjoin a first peripheral surface that is one surface selected from the peripheral surface at the side of the housing and the peripheral surface at the side of the rotor hub;
        a second race configured to adjoin a second peripheral surface that is the other surface selected from the peripheral surface at the side of the housing and the peripheral surface at the side of the rotor hub; and
        a rolling element interposed between the first race and the second race, and wherein the axial movement prevention part comprises:
        a bearing groove provided in a surface of the first race facing the first peripheral surface;
        a peripheral surface groove provided in the first peripheral surface and disposed at a position corresponding to the bearing groove; and
        a clearance prevention ring inserted across the peripheral surface groove and the bearing groove.

2. The hybrid driving module of claim 1, wherein a height of the clearance prevention ring is equal to or smaller than a depth of the peripheral surface groove.

3. The hybrid driving module of claim 2, wherein a height of the clearance prevention ring is larger than a depth of the bearing groove.

4. The hybrid driving module of claim 1, wherein a first bearing stepped portion is provided on the first peripheral surface and protrudes in the radial direction so as to interfere with one side of the first race based on an axial direction.

5. The hybrid driving module of claim 1, wherein a second bearing stepped portion is provided on the second peripheral surface and protrudes in the radial direction so as to interfere with the other side of the second race based on an axial direction.

6. The hybrid driving module of claim 5, wherein a bearing fixing part is provided on the second peripheral surface and interferes with one side of the second race based on the axial direction.

7. The hybrid driving module of claim 6, wherein the bearing fixing part comprises:
   a ring groove formed at a position on the second peripheral surface that does not face the second race; and
   a snap ring inserted into the ring groove, and
   wherein a snap ring portion protruding in the radial direction from the ring groove interferes with one side of the second race based on the axial direction.

8. The hybrid driving module of claim 6, wherein the bearing fixing part comprises a plastic processing part plastically deformed so that the second peripheral surface protrudes in the radial direction in a state in which the bearing is inserted into the second bearing stepped portion in the axial direction.

9. The hybrid driving module of claim 8, wherein the plastic processing part is formed by caulking processing.

10. The hybrid driving module of claim 1, wherein the housing includes an input member rotatably supported on the housing and configured to receive driving power from an engine, and a peripheral surface at the side of the housing is provided on the input member.

11. The hybrid driving module of claim 10, wherein the rotor hub has a central axis extension portion extending in an axial direction from the central axis extension portion of the rotor hub, and the peripheral surface at the side of the rotor hub is provided on the central axis extension portion.

12. The hybrid driving module of claim 11, wherein a peripheral surface of the central axis extension portion is provided at a side positioned radially inward of the peripheral surface of the input member.

13. The hybrid driving module of claim 1, wherein the housing includes an axial protruding portion protruding in an axial direction from the housing, and the peripheral surface at the side of the housing is provided on the axial protruding portion.

14. The hybrid driving module of claim 13, wherein the rotor hub includes a hub ridge connected to the rotor hub so that a rotation thereof is restricted,
   the hub ridge extends in the radial direction,
   an axial extension portion is provided at a radial inner side of the hub ridge and extends in the axial direction from the hub ridge, and
   the peripheral surface at the side of the rotor hub is provided on the axial extension portion.

15. The hybrid driving module of claim 14, wherein a peripheral surface of the axial protruding portion is provided at a side positioned radially inward of the peripheral surface of the axial extension portion.

* * * * *